United States Patent
Nabar et al.

(10) Patent No.: US 9,420,594 B1
(45) Date of Patent: Aug. 16, 2016

(54) METHODS AND APPARATUS FOR ADAPTIVELY SELECTING A COMMUNICATIONS MODE IN HIGH FREQUENCY SYSTEMS

(71) Applicant: Marvell International Ltd., Hamilton (BM)

(72) Inventors: Rohit U. Nabar, Sunnyvale, CA (US); Hongyuan Zhang, Sunnyvale, CA (US); Arul Durai Murugan Palanivelu, Sunnyvale, CA (US); Hui-Ling Lou, Sunnyvale, CA (US); Songping Wu, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/550,511

(22) Filed: Nov. 21, 2014

Related U.S. Application Data (63) Continuation of application No. 12/400,442, filed on Mar. 9, 2009, now Pat. No. 8,897,394.

(60) Provisional application No. 61/043,385, filed on Apr. 8, 2008.

(51) Int. Cl.
 *H04L 27/28* (2006.01)
 *H04W 72/08* (2009.01)
 (Continued)

(52) U.S. Cl.
 CPC .......... *H04W 72/085* (2013.01); *H04L 27/261* (2013.01); *H04W 24/10* (2013.01); *H04W 88/06* (2013.01)

(58) Field of Classification Search
 CPC .. H04W 88/06; H04W 88/10; H04L 27/2647; H04L 5/0005

USPC .................. 375/260, 265; 370/437, 350, 342; 455/553, 69

See application file for complete search history.

(56) References Cited

U.S. PATENT DOCUMENTS 6,154,452 A * 11/2000 Marko et al. .................. 370/321
6,233,247 B1   5/2001 Alami et al.
(Continued)

OTHER PUBLICATIONS

Daniels, R.C.; Heath, R.W.; "60 GHz wireless communications: emerging requirements and design recommendations," Vehicular Technology Magazine, IEEE, vol. 2, No. 3, pp. 41-50, Sep. 2007.
(Continued)

*Primary Examiner* — Daniel Washburn
*Assistant Examiner* — Fitwi Hailegiorgis (57) ABSTRACT

Methods and apparatus are provided for adaptively selecting a communications mode in high frequency systems. A first dual-mode device having capabilities of using two or more high frequency communications modes, such as OFDM and SC modulation, may transmit a signal to a second dual-mode device with the same capabilities. The second dual-mode device may compute a channel characteristic associated with a high frequency communications channel and select an optimal high frequency communications mode. The second dual-mode device may transmit information indicative of the channel characteristic or the selected communications mode to the first dual-mode device. The first dual-mode device may select and operate using the optimal high frequency communications mode based on the information received from the second dual-mode device. The first and second dual-mode devices may communicate using the selected high frequency communications mode.

20 Claims, 5 Drawing Sheets

(51) Int. Cl.
*H04W 88/06* (2009.01)
*H04W 24/10* (2009.01)
*H04L 27/26* (2006.01)

(56) References Cited

U.S. PATENT DOCUMENTS

| | | | |
|---|---|---|---|
| 6,421,395 B1* | 7/2002 | Wei | H04L 1/0003 375/265 |
| 6,754,169 B2 | 6/2004 | Baum et al. | |
| 6,925,067 B2 | 8/2005 | Jou | |
| 7,161,987 B2 | 1/2007 | Webster et al. | |
| 7,447,189 B2 | 11/2008 | Jou | |
| 7,656,969 B2 | 2/2010 | Strong | |
| 8,045,992 B2* | 10/2011 | Vannithamby | H04L 1/0026 370/310 |
| 2002/0142796 A1* | 10/2002 | Sutton et al. | 455/553 |
| 2003/0021245 A1 | 1/2003 | Haumonte et al. | |
| 2005/0174981 A1 | 8/2005 | Heath et al. | |
| 2006/0013250 A1 | 1/2006 | Howard et al. | |
| 2006/0039318 A1* | 2/2006 | Oh | H04L 5/0007 370/328 |
| 2006/0234643 A1* | 10/2006 | Kikuchi | 455/69 |
| 2007/0171889 A1* | 7/2007 | Kwon et al. | 370/350 |
| 2007/0201503 A1* | 8/2007 | Nishio | 370/437 |
| 2008/0043868 A1 | 2/2008 | Feher | |
| 2009/0003475 A1* | 1/2009 | Erceg | H04B 7/0417 375/260 |
| 2009/0279527 A1* | 11/2009 | Fukuoka | H04L 5/12 370/342 |
| 2013/0286962 A1* | 10/2013 | Heath et al. | 370/329 |

OTHER PUBLICATIONS

Hara, Shinsuke and Mouri, Masutada and Okada, Minoru and Morinaga, Norihiko, Transmission performance analysis of Multi-Carrier Modulation in frequency selective fast Rayleigh fading channel, Wireless Personal Communications, pp. 335-356, vol. 2, 1995.

* cited by examiner

METHODS AND APPARATUS FOR ADAPTIVELY SELECTING A COMMUNICATIONS MODE IN HIGH FREQUENCY SYSTEMS

CROSS REFERENCE TO RELATED APPLICATION

This application is a continuation of U.S. patent application Ser. No. 12/400,442, filed Mar. 9, 2009 (allowed), which claims the benefit under 35 U.S.C. 119(e) of U.S. Provisional Application No. 61/043,385, filed Apr. 8, 2008, both of which are hereby incorporated by reference herein in their entireties.

BACKGROUND OF THE INVENTION

The present invention is directed to methods and apparatus for adaptively selecting a communications mode in high frequency systems (e.g., 60 GHz), and more particularly to selecting a high frequency communications mode based on characteristics of a communications channel.

High data rate (e.g., about 2.5 Gbit/s) wireless communications systems are increasingly desirable with the greater use of wireless devices. High frequency data rate wireless communications systems, such as 60 GHz systems, provide wider communications bandwidth (e.g., about 2 GHz) and thereby increase the amount of data that may be transmitted/received between devices. Compared to lower frequency systems, signals in high frequency systems (e.g., 60 GHz carrier frequency systems) are prone to greater atmospheric attenuation (e.g., delay dispersion or delay spread), making them difficult to operate over long distances (e.g., greater than 10 meters).

For example, high frequency signals in the 57-64 GHz frequency range may be subject to resonance of oxygen molecules and may thereby be severely attenuated. Even over relatively short distances (e.g., less than 10 meters), rain fade may pose a serious problem, caused when absorption by rain reduces signal strength. In climates other than deserts, absorption due to humidity may also have an impact on propagation. Thus, the transmitters and receivers operating in high frequency systems have to be designed specifically to compensate for the signal attenuation factors that are present in high frequency systems. In particular, the power amplifier (PA) efficiency at the transmitter and the analog-to-digital converter (ADC) bit-width at the receiver may have operate under more constraints than traditional lower frequency systems. For example, a power amplifier may be required to operate linearly over a wider interval or the speed or precision of an ADC may be to be increased.

The high frequency communications mode circuitry that is used to generate signals that compensate for attenuation and other channel characteristics (e.g., delay spread) in short range high frequency communications may be less complex and may consume less power than the high frequency communication mode circuitry that is used to generate signals that compensate for the attenuation factors in long range high frequency communications. This is typically because the peak-to-average-ratio (PAPR) in the short range signal may be lower than that in the long range signal. Thus, a device having a particular high frequency communications mode implementation may be suitable for use in one type of application (e.g., short range) but not in another (e.g., long range). As defined herein, the terms delay dispersion and delay spread mean the time difference between the arrival moment of a first multi-path component of the signal and the last multi-path component in systems where an identical signal arrives at its destination at different times.

Accordingly, it is desirable to provide enhanced systems and methods for adaptively selecting a high frequency communications mode implementation based on characteristics of a communications channel (e.g., attenuation factors present in the communications channel and delay spread).

SUMMARY OF THE INVENTION

In accordance with the principles of the present invention, methods and apparatus are provided for adaptively selecting a communications mode in high frequency systems, and more particularly to selecting a high frequency communications mode based on characteristics of a communications channel.

In some embodiments, a first dual-mode device (e.g., a device that has at least two high frequency communications modes available for use) may transmit a signal to a second dual-mode device. The signal may include data, a training pattern, or any other suitable information that may be used to compute a channel characteristic. The signal may be transmitted using a first high frequency communications mode (e.g., orthogonal frequency division multiplexing (OFDM)), a second high frequency communications mode (e.g., single carrier (SC modulation)) or a combination of high frequency communications modes. The signal may be transmitted through a high frequency communications channel (e.g., a forward link) or a low band communications channel (e.g., a reverse link).

The second dual-mode device may compute a channel characteristic (e.g., a delay spread or channel estimate) associated with the high frequency communications channel based on the signal received from the first dual-mode device. In some implementations, the second dual-mode device may transmit information indicative of the computed channel characteristic to the first dual-mode device. The second dual-mode device may transmit this information through a low band communications channel (e.g., a reverse link) or a high frequency communications channel (e.g., a forward link). The first dual-mode device may select an optimal high frequency communications mode between two or more available high frequency communications modes (e.g., OFDM and SC modulation) based on the channel characteristic received from the first dual-mode device. The first dual-mode device may communicate with the second dual-mode device using the selected high frequency communications mode.

In some implementations, the second dual-mode device may select an optimal high frequency communications mode between two or more available high frequency communications modes (e.g., OFDM and SC modulation) based on the channel characteristic associated with the high frequency communications channel computed by the second dual-mode device. The second dual-mode device may transmit information indicative of the selected high frequency communications channel to the first dual-mode device. The second dual-mode device may transmit this information through a low band communications channel (e.g., a reverse link) or a high frequency communications channel (e.g., a forward link). The first dual-mode device may be configured to operate using the high frequency communications mode selected by the second dual-mode device. The first dual-mode device may communicate with the second dual-mode device using the selected high frequency communications mode.

In some embodiments, a first dual-mode device receives a signal from a second dual-mode device through a low band communications channel (e.g., a reverse link). The signal may include data, a training pattern or other information that may be used to compute a channel characteristic of the low band communications channel or a high frequency communications channel.

The first dual-mode device may compute a channel characteristic associated with the low band communications channel based on the signal received from the second dual-mode device. The first dual-mode device may determine a channel characteristic associated with the high frequency communications channel based on the channel characteristic associated with the low band communications channel by, for example, computing a reciprocal of the channel characteristic associated with the low band communications channel.

The first dual-mode device may select an optimal high frequency communications mode based on the channel characteristic associated with the high frequency communications channel. The first dual-mode device may transmit information indicative of the selected high frequency communications channel to the second dual-mode device and the first and second dual-mode device may communicate using the selected high frequency communications channel.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

This invention generally relates to adaptively selecting a communications mode in high frequency systems (e.g., 60 GHz). For illustrative purposes, this invention is described in the context of dual-mode devices that operate with OFDM or SC modulation communications mode implementations (e.g., physical layers in the OSI model or PHY modes) using a 60 GHz carrier frequency. It should be understood, however, that this invention is applicable to any other multi-mode device that uses the same and/or other combinations of high frequency communications mode implementations (e.g., code division multiple access (CDMA), frequency division multiple access (FDMA), multiple-input multiple-output, multiple antenna, single carrier with frequency domain prefix, global system for mobile communications (GSM), any other suitable high frequency communications mode implementation or any combination thereof) with a different higher or lower high carrier frequency (e.g., 57 GHz, 58 GHz, 59 GHz, 60 GHz, 61 GHz, 62 GHz, 63 GHz, 64 GHz, 65 GHz, 66 GHz, or 67 GHz carrier frequency or any carrier frequency in the range between 57-67 GHz). It should be noted that the carrier frequency does not have to be an integer value but may be any integer or non-integer value substantially near the range of 57-67 GHz.

Preferably, the communications modes in the dual-mode device include a communications mode that is suitable for use in long range applications with high delay spreads (e.g., more than 5 nanoseconds) and another communications mode that is suitable for use in short range applications with smaller delay spreads (e.g., in the order of 0-5 nanoseconds). In some embodiments, the dual-mode device includes an OFDM high frequency communications mode that is suitable for long range applications and an SC modulation high frequency communications mode that is suitable for short range applications.

An OFDM high frequency communications mode implementation may be capable of sustaining high data rates (e.g., about 2.5 Gbit/s) even in the presence of severe attenuation factors (e.g., large delay spread) in the communications channel and thereby may be suitable for use in long range applications. An SC modulation high frequency communication mode, on the other hand, may be capable of sustaining moderate or low data rates (e.g., 1 Gigabits per second) in the presence of less severe attenuation factors and thereby may be suitable for use in near line-of-sight or short range applications. Although SC modulation communications modes provide lower data rates than OFDM communications modes, SC modulation communications modes consume less power, are less complex to implement in hardware and have high transmission power efficiency. However, the equalizer in SC modulation high frequency communication modes may be increasingly more complicated to design for channels with high delay spread.

Each of the high frequency communications modes (e.g., OFDM and SC modulation) may have a particular advantage over the other communications mode and accordingly it may be desirable to have both communications mode hardware implementations available on the device (e.g., dual-mode device). As defined herein, a dual-mode device is a device that can selectively use one of at least two different communications mode implementations. The dual-mode device may be a cell-phone, computer, laptop, portable computing device, personal digital assistant, BlackBerry, server, radar system, satellite, scanner, or any other stationary or portable device that has high frequency wireless communications capabilities.

In some implementations, the dual-mode device may select one of the high frequency communications modes based on a channel characteristic. For example, when the delay spread of the channel is high, the dual-mode device may select and operate using an OFDM high frequency communication mode implementation. Alternatively, when the delay spread of the channel is low, the dual-mode device may select and operate using an SC modulation high frequency communication mode implementation. The dual-mode device may switch between the two or more high frequency communications modes as the dual-mode device changes locations or as characteristics of the channel change.

Allowing the dual-mode device to adaptively select a high frequency communications mode lends robustness to a variety of channel conditions and may save power since the selected high frequency communications mode is optimal for the particular channel conditions. For example, when the channel conditions are such that a low power communications mode suffices (e.g., small delay spread is present) the dual-mode device may use the low power communications mode and avoid wasting power with a more complex communications mode.

Figure 1:
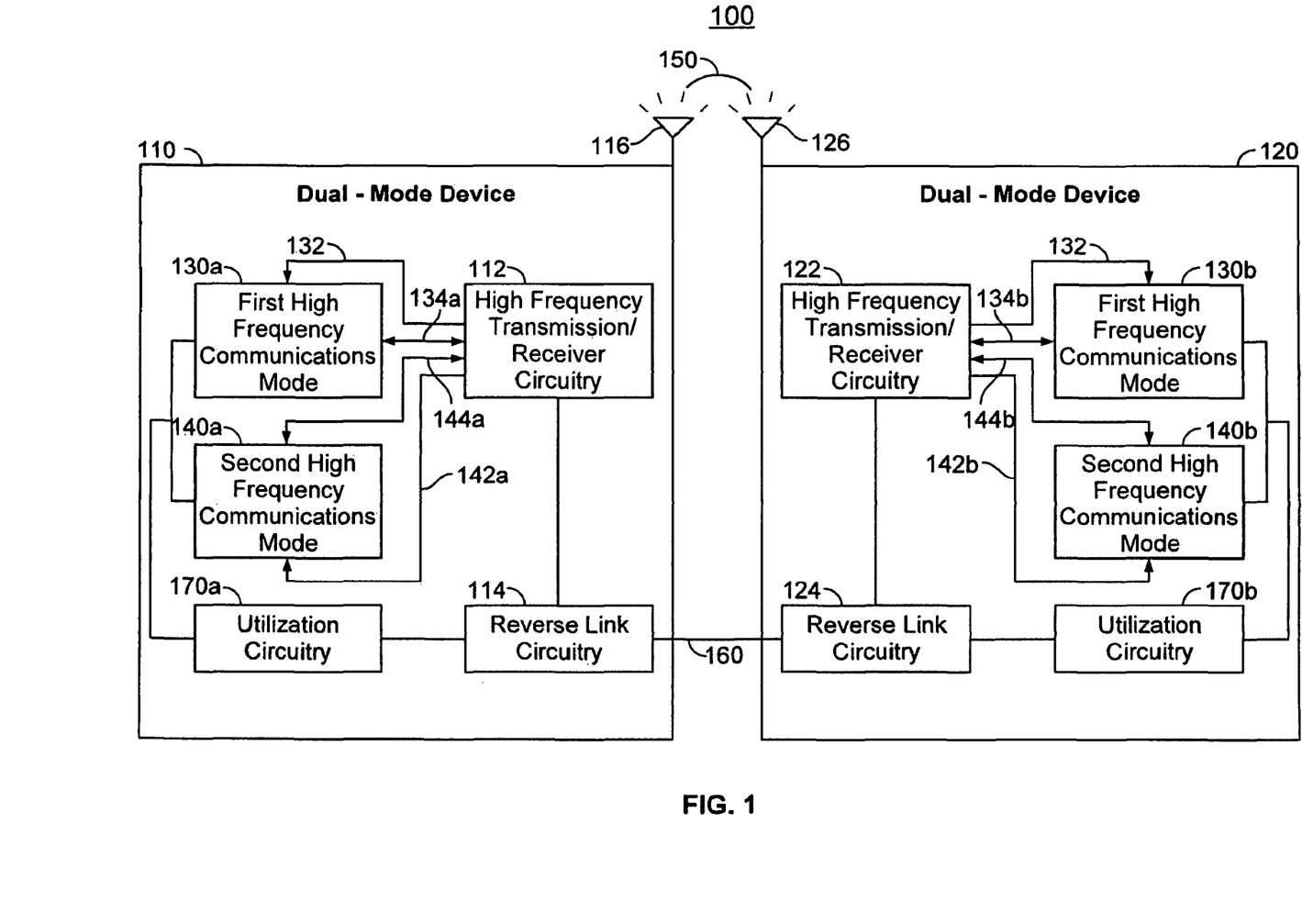
FIG. 1 is a diagram of an illustrative adaptive high frequency communications system in accordance with an embodiment of the present invention.

FIG. 1 is a diagram of an illustrative adaptive high frequency communications system 100 in accordance with an embodiment of the present invention. System 100 includes a first dual-mode device 110 and a second dual-mode device 120. It should be understood that more than two dual-mode devices may be present in system 100 although only two are drawn for the sake of brevity.

A first dual-mode device 110 includes a first high frequency communications mode circuitry 130a, a second high frequency communications mode circuitry 140a, utilization circuitry 170a, a high frequency transmitter/receiver circuitry 112, a reverse link circuitry 114 and one or more antennas 116. A second dual-mode device 120 includes a first high frequency communications mode circuitry 130b, a second high frequency communications mode circuitry 140b, utilization circuitry 170b, a high frequency transmitter/receiver circuitry 122, a reverse link circuitry 124 and one or more antennas 126. In some implementations, where the forward and reverse links are the same (e.g., the forward and reverse communications use a high frequency communications channel), reverse link circuitry 114 or 124 may share circuitry with or be the same circuitry as transmitter/receiver circuitry 112 or 122, respectively. It should be understood, that a discussion referring to first high frequency communications mode circuitry 130 applies to first high frequency communications mode circuitries 130a and 130b. Similarly, discussions relating to second high frequency communications mode circuitry 140 applies to second high frequency communications mode circuitries 140a and 140b and utilization circuitry 170 applies to utilization circuitries 170a and 170b.

Transmitter/receiver circuitries 112 and 122 may include circuitry necessary for transmitting and/or receiving a signal over a high frequency communications channel 150 using respective one or more antennas 116 and 126. For example, transmitter/receiver circuitries 112 and 122 may include an encoder, decoder, ADC, digital-to-analog converter (DAC), analog and/or digital filter, equalizer, modulator, power amplifier and any other suitable component necessary to transmit/receive a data and/or training signal over a high frequency wireless communications medium (e.g., 60 GHz communications medium). High frequency communications channel 150 is referred to as the forward link communications channel through which a source (e.g., a base station) transmits information to a wireless device (e.g., a cell phone) over a high frequency.

Transmitter/receiver circuitries 112 and 122 may receive data which is modulated or encoded by first high frequency communications mode circuitry 130 and second high frequency communications mode circuitry 140. In particular, when dual-mode device 110 is operating using a first communications mode (e.g., OFDM), first high frequency communications mode circuitry 130a may be enabled and may provide data or signals 134a in the appropriate form for transmission to transmitter/receiver circuitry 112. Alternatively, when dual-mode device 110 operates using a second communications mode (e.g., SC modulation), second high frequency communications mode circuitry 140a may be enabled and may provide data or signals 144a in the appropriate form for transmission to transmitter/receiver circuitry 112.

In some implementations, the first high frequency communications mode circuitry 130 operates using a high carrier frequency that is different (higher or lower) from the carrier frequency used by the second high frequency communications mode circuitry 140. For example, the first high frequency communications mode circuitry 130 may operate using a 59 GHz carrier frequency while the second high frequency communications mode circuitry 140 may operate using a 61 GHz carrier frequency. It should be understood that this implementation is applicable to either or both dual-mode devices.

Preferably, only one communications mode circuitry 130 or 140 (i.e., the selected communications mode circuitry) is enabled at one time to conserve power in transmitting data. However, in some implementations, both high frequency communications mode circuitries 130 and 140 may be enabled and operate simultaneously and corresponding transmitter/receiver circuitry 112 or 122 may select which data or signals 134 or 144 to operate on and transmit. Alternatively, in some implementations, both high frequency communications mode circuitries 130 and 140 may be enabled to transmit/receive signals using corresponding transmitter/receiver circuitries 112 or 122 in a combined high frequency communications mode (e.g., a signal may be transmitted/received using partly SC modulation and partly OFDM).

Transmitter/receiver circuitry 112 or 122 may receive a data or other type of signal using one or more antennas 116 or 126, respectively, and provide the received signal to the corresponding high frequency communications mode circuitry 130 or 140 that is enabled. Alternatively, transmitter/receiver circuitry 112 or 122 may provide the received data to both corresponding first and second high frequency communications mode circuitries 130 and 140 and only the enabled high frequency communications mode circuitry 130 or 140 operates on the received data. For example, dual-mode device 120 may operate using a selected second high frequency communications mode (e.g., SC modulation) and accordingly, any data or signal 144b received by transmitter/receiver circuitry 122 may be provided to second high frequency communications mode circuitry 140b which may implement the selected second high frequency communications mode (e.g., SC modulation).

In some implementations both communications mode circuitries 130b and 140b may be enabled and operate simultaneously and transmitter/receiver circuitry 122 may select the appropriate high frequency communications mode circuitry to which to provide received data or signals 134b or 144b. Alternatively, in some implementations, both high frequency communications mode circuitries 130b and 140b may be enabled when dual-mode device 120 operates in a combined communications mode when receiving signals using transmitter/receiver circuitry 122 (e.g., a signal may be received using partly SC modulation and partly OFDM).

Each high frequency communications mode circuitry 130 and 140 may be coupled to utilization circuitry 170. Utilization circuitry 170 may be any type of processing circuitry that is used to process data that is received or to be transmitted. Utilization circuitry 170 may include a memory (not shown) and various other digital or analog signal processing circuitries. High frequency communications mode circuitries 130 and 140 may process the received data or signals and extract data for use by utilization circuitry 170 using the selected high frequency communications mode. Also, high frequency communications mode circuitries 130 and 140 may receive corresponding data or signals from utilization circuitry 170 and may prepare the data or signals for transmission using the selected high frequency communications mode.

For example, first high frequency communications mode circuitry 130a may include circuitry necessary for processing data that is received or to be transmitted using a OFDM high frequency communications mode. In particular, first high frequency communications mode circuitry 130a may include a power amplifier, equalizer, ADC, DAC, analog and/or digital filters, Fast Fourier Transform (FFT) circuitry and/or Inverse FFT (IFFT) circuitry, encoder, decoder, or any other component necessary to implement a OFDM high frequency communications mode. Similarly, second high frequency communications mode circuitry 140a may include circuitry necessary for processing data that is received or to be transmitted using an SC modulation high frequency communications mode. In particular, second high frequency communications mode circuitry 140*a* may include a power amplifier, equalizer, ADC, DAC, analog and/or digital filters, Fast Fourier Transform (FFT) circuitry and/or Inverse FFT (IFFT) circuitry, encoder, decoder, or any other component necessary to implement an SC modulation communications mode.

It should be understood that first and/or second high frequency communications mode circuitry 130 or 140 may be implemented by software. For example, first high frequency communications mode circuitry 130 may include computer program code that is provided to a processor for encoding or preparing a particular signal (e.g., a data signal) for transmission using the first high frequency communications mode (e.g., OFDM). Additionally, although first and second high frequency communications mode circuitries 130 and 140 are drawn separately, it should be understood that high frequency communications mode circuitries 130 and 140 may be implemented by one component that may be configured using control or configuration bits (not shown) to operate in a selected high frequency communications mode (e.g., OFDM or SC modulation).

Reverse link circuitries 114 and 124 may be used to transmit information or data signals from one dual-mode device to another through a low band communications channel 160. For example, low band communications channel 160 may be different from high frequency communications channel 150. In particular, low band communications channel 160 may be an infra-red, Bluetooth or any other short or long range communications channel. Reverse link circuitries 124 and 114 may use the same or different modulation scheme as used in high frequency communications channel 150 but may use a smaller carrier frequency (e.g., any carrier in the KHz or MHz frequency range or a carrier frequency substantially within the range of 2-5 GHz). Reverse link circuitry may be used to communicate small amounts of information that is not necessary to transmit through a high data rate channel so as to not consume space and power on the high frequency communications channel 150.

For example, low band communications channel 160 may be used to synchronize first and second dual-mode devices 110 and 120 to operate using the same high frequency communications mode circuitry 130 or 140. In particular, as discussed in more detail below, reverse link communications circuitry 124 may transmit information indicative of the high frequency communications mode that is selected by second dual-mode device 120 or may transmit information indicative of a channel characteristic (e.g., a channel estimate, channel length, channel values, or delay spread) of high frequency communications channel 150 that is computed by second dual-mode device 120.

In some implementations, channel 160 may be the same as channel 150. This may be the case when a dual-mode device does not have the capabilities to transmit information through a reverse link that uses a separate communications channel from the forward link. Alternatively, it may be desirable for the high frequency communications channel 150 to be shared by the forward and reverse links. In such scenarios, reverse link circuitry 114 or 124 may transmit the information to another dual-mode device 110 or 120 through high frequency communications channel 150 using respective transmitter/receiver circuitry 112 or 122 instead of high frequency communications channel 160.

In some embodiments, first dual-mode device 110 may transmit a signal using one or more antennas 116 through high frequency communications channel 150 (e.g., the forward link) to second dual-mode device 120. The transmitted signal may be transmitted by first dual-mode device 110 using any communications mode or combination of communications modes available on first dual-mode device 110. For example, the signal may be transmitted using an OFDM high frequency communications mode, SC modulation high frequency communications mode, or any combination of the same or different high frequency communications modes. In some implementations, the signal may be transmitted by first dual-mode device 110 over low band communications channel 160 (e.g., the reverse link) instead.

The signal transmitted by first dual-mode device 110 may include a training pattern or some other data that may be used to compute a channel characteristic (e.g., a channel estimate, channel length, channel values, or delay spread) of high frequency communications channel 150. The signal transmitted by first dual-mode device 110 may also or alternatively include data intended for second dual-mode device 120. For example, the signal transmitted by first dual-mode device 110 may include voice data, message data, radar or satellite data, user data, or any other type of information that second dual-mode device 120 may use in connection with a particular application.

Second dual-mode device 120 may receive the signal from first dual-mode device 110 (either through the forward or reverse link) and computes a channel characteristic associated with high frequency communications channel 150 (e.g., the forward link) based on the received signal. For example, the received signal may include a training pattern which may be used to compute a channel estimate of high frequency communications channel 150. In some implementations, where the signal is received through the reverse link, second dual-mode device 120 may compute a channel length associated with the forward link by computing a reciprocal of the channel estimate associated with the reverse link.

Figure 2:
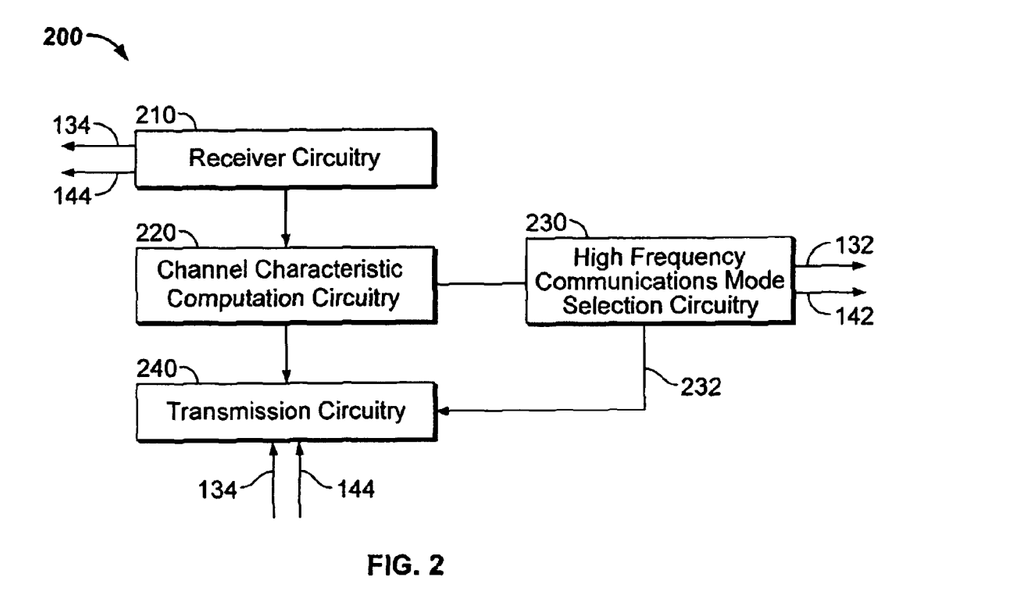
FIG. 2 is a diagram of an illustrative dual-mode device high frequency transmitter/receiver circuitry in accordance with an embodiment of the present invention.

FIG. 2 is a diagram of an illustrative dual-mode device high frequency transmitter/receiver circuitry 200 in accordance with an embodiment of the present invention. Transmitter/receiver circuitry 200 is exemplary of some of the components in high frequency transmitter/receiver circuitries 112 and 122 (FIG. 1). Transmitter/receiver circuitry 200 may include receiver circuitry 210, channel characteristic computation circuitry 220, high frequency communications mode selection circuitry 230 and transmission circuitry 240. Receiver circuitry 210 may include modulators, encoders, decoders, equalizers and various other components necessary to process and extract information from the signal received by the dual-mode device.

Channel characteristic computation circuitry 220 may include circuitry for computing a channel estimate, channel length, delay spread or any other suitable characteristic of high frequency communications channel 150 or low band channel 160. For example, when receiver circuitry 210 receives a signal through low band channel 160, channel characteristic computation circuitry 220 may compute a reciprocal of the channel estimate associated with the low band channel 160 to derive the channel estimate or channel length of high frequency communications channel 150. The channel characteristic computed by channel characteristic computation circuitry 220 may be provided to transmission circuitry 240 and/or high frequency communications mode selection circuitry 230.

In some implementations, transmission circuitry 240 in second dual-mode device 120 may transmit to first dual-mode device 110 (either through the forward or reverse link) information indicative of the channel characteristic computed by channel characteristic computation circuitry 220. For example, second dual-mode device 120 may compute a channel estimate associated with high frequency communications channel 150 based on the signal it receives from first dual-mode device 110. Second dual-mode device 120 may transmit the computed channel estimate to first dual-mode device 110 through low band communication channel 160 or high frequency communications channel 150. As discussed in more detail below in connection with FIG. 3, first dual-mode device 110 may select a communications mode based on the channel characteristic information it receives from second dual-mode device 120.

In some implementations, channel characteristic computation circuitry 220 in second dual-mode device 120 may provide the channel characteristic to high frequency communications mode selection circuitry 230. High frequency communications mode selection circuitry 230 may select an optimal high frequency communications mode from the high frequency communications modes available in second dual-mode device 120 based on the computed channel characteristic of high frequency communications channel 150. For example, high frequency communications mode selection circuitry 230 may select (e.g., enable) first high frequency communications mode circuitry 130 (e.g., OFDM implementation) when the channel characteristic indicates a high delay spread is associated with high frequency communications channel 150. Similarly, high frequency communications mode selection circuitry 230 may select (e.g., enable) second high frequency communications mode circuitry 140 (e.g., SC modulcation) when the channel characteristic indicates a low delay spread is associated with high frequency communications channel 150.

For example, a low delay spread may be in the order of 5 nanoseconds or less and a high delay spread may be in the order of more than 5 nanoseconds. However, it should be noted that these threshold values for delay spread are guidelines and may be adjustable depending on the specifics of the modulation used. In some implementations, delay spread may be derived from the channel estimate by considering the number of non-significant taps (e.g., taps with power above a certain threshold value) in the channel estimate. The delay spread may be computed as the time difference between the first and last of the channel estimate taps. In some implementations, OFDM is selected when the value of delay spread is above a certain threshold and SC modulation is selected otherwise.

High frequency communications mode selection circuitry 230 may select or enable the selected communications mode implementation using control signals 132 and 142. For example, high frequency communications mode selection circuitry 230 may enable first high frequency communications mode circuitry 130 by asserting control signal 132. Similarly, high frequency communications mode selection circuitry 230 may enable second high frequency communications mode circuitry 140 by asserting control signal 142. High frequency communications mode selection circuitry 230 may also disable either or both first and second communications mode circuitries 130 and 140 by providing the necessary values (e.g., de-asserting) through the corresponding control signals 132 and 142. For example, high frequency communications mode selection circuitry 230 may enable first high frequency communications mode circuitry 130 by asserting control signal 132 and may disable second high frequency communications mode circuitry 140 by de-asserting control signal 142.

First and second communications mode circuitries 130 and 140 may each have a respective transistor (not shown) that is coupled to a power terminal and is used to provide power to the respective first or second communications mode circuitry 130 or 140. The transistor may have a gate terminal coupled to control signal 132 or 142 which activates or de-activates the transistor. For example, when control signal 132 is asserted, the transistor of first high frequency communications mode circuitry 130 may be enabled or activated. When the transistor in first high frequency communications mode circuitry 130 is active or enabled, the transistor may supply power to the components in first high frequency communications mode circuitry 130 and thereby enable the first high frequency communications mode implementation (e.g., OFDM) in the dual-mode device. Similarly, when control signal 132 is de-asserted, the transistor of first high frequency communications mode circuitry 130 may be disabled or de-activated. When the transistor is de-activated or disabled in first high frequency communications mode circuitry 130, the transistor may cut off the supply of power to the components in first high frequency communications mode circuitry 130 and thereby disable the first high frequency communications mode implementation (e.g., OFDM) in the dual-mode device which may consequently conserve power.

The transistor that may be provided in second high frequency communications mode circuitry 140 may operate in a similar manner. The transistor in the respective first/second high frequency communications mode circuitry may be an NMOS, PMOS, CMOS, bipolar junction transistor, or any other suitable transistor or switch that supplies or stops the supply of power to the high frequency communications mode circuitry when enabled or disabled, respectively. It should be understood that any other type of suitable control or logic circuitry (e.g., an encoder or decoder) in first and second high frequency communications mode circuitries 130 and 140 may be provided to enable or disable their respective operations instead of or in addition to the transistor.

High frequency communications mode selection circuitry 230 in second dual-mode device 120 may provide information or data 232 indicative of the selected high frequency communications mode to transmission circuitry 240 for transmission to first dual-mode device 110 (FIG. 1). Transmission circuitry 240 in second dual-mode device 120 may transmit to first dual-mode device 110 (either through the forward or reverse link) information or data 232 indicative of the high frequency communications mode selected by high frequency communications mode selection circuitry 230.

For example, second dual-mode device 120 may select a high frequency communications mode that is optimal based on the characteristics of high frequency communications channel 150 and provide information or data indicative of the selected high frequency commutations mode (e.g., SC modulation). Second dual-mode device 120 may transmit the information indicative of the selected high frequency communications mode (e.g., SC modulation) to first dual-mode device 110 through low band communication channel 160 (e.g., a reverse link) or high frequency communications channel 150 (e.g., forward link). As discussed in more detail below in connection with FIG. 3, first dual-mode device 110 may process the information received from second dual-mode device 120 and be configured to operate using the high frequency communications mode selected by second dual-mode device 120.

Figure 3:
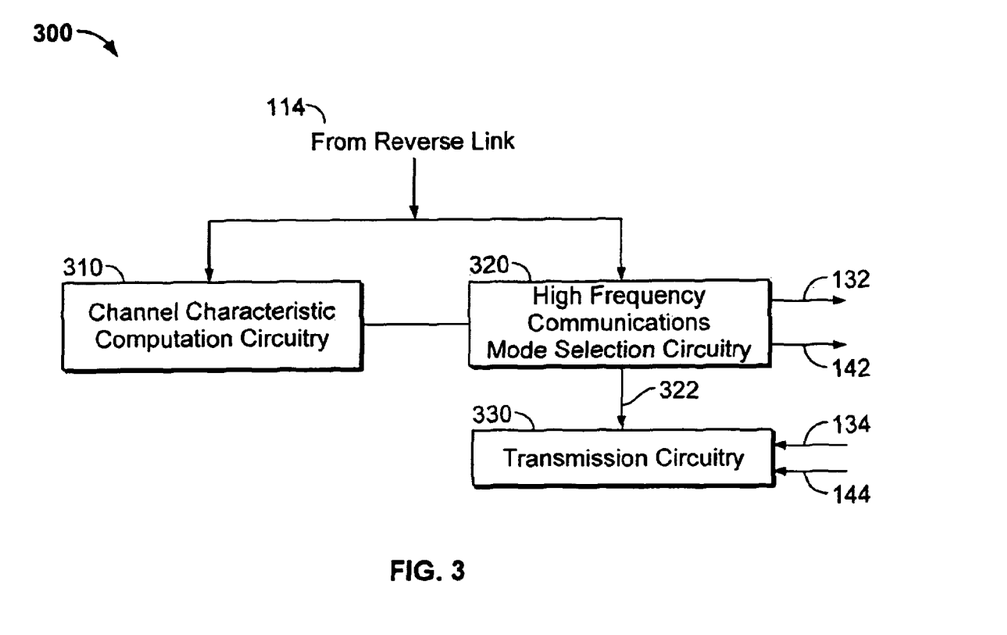
FIG. 3 is a diagram of an illustrative dual-mode device high frequency transmitter/receiver circuitry in accordance with an embodiment of the present invention.

FIG. 3 is a diagram of an illustrative dual-mode device high frequency transmitter/receiver circuitry 300 in accordance with an embodiment of the present invention. Transmitter/receiver circuitry 300 is also exemplary of some of the components in high frequency transmitter/receiver circuitries 112 and 122 (FIG. 1). Transmitter/receiver circuitry 300 may include channel characteristic computation circuitry 310, high frequency communications mode selection circuitry 320 and transmission circuitry 330. First dual-mode device 110 may include circuitry 300 and may receive information indicative of the channel characteristic of the high frequency communications channel 150 from second dual-mode device 120 through high frequency communications channel 150 or low band communications channel 160.

First dual-mode device 110 may provide the information indicative of the channel characteristic received from second dual-mode device 120 to high frequency communications mode selection circuitry 320. As discussed above in connection with FIG. 2, high frequency communications mode selection circuitry 320 may use the channel characteristic information to select an optimal communications mode (e.g., OFDM or SC modulation). High frequency communications mode selection circuitry 320 may enable/disable the appropriate high frequency communications mode circuitry 130a or 140a using respective control signals 132a and 142a.

High frequency communications mode selection circuitry 320 in first dual-mode device 110 may indicate the selected high frequency communications mode to transmission circuitry 330 through link 322. Transmission circuitry 330 may transmit (through the forward or reverse link) to second dual-mode device 120 information indicative of the selected communications mode such that both dual-mode devices operate using the same high frequency commutations mode. In particular, after second dual-mode device 120 receives the information indicating which high frequency communications mode first dual-mode device 110 selected, second dual-mode device 120 may be configured to operate using the selected high frequency communications mode circuitry by enabling/disabling the appropriate high frequency communications mode circuitries.

Transmission circuitry 330 may receive data encoded/modulated using one of the high frequency communications mode through link 134 and 144 from first and second high frequency communications mode circuitries 130 and 140. Transmission circuitry 330 may choose one of the data from links 134 or 144 to transmit based on the communications mode selected by high frequency communications mode selection circuitry 320. For example, when high frequency communications mode selection circuitry 320 selects first high frequency communications mode as the optimal communications mode, transmission circuitry 330 may use data received through link 134 from first high frequency communications mode circuitry 130 and ignore data received through link 144 from second high frequency communications mode circuitry 140. Accordingly, the first and second dual-mode devices may operate and communicate with each other using a selected high frequency communications mode.

In some embodiments, second dual-mode device 120 may transmit a signal (e.g., a data or training signal) through low band communications channel 160 (e.g., reverse link). First dual-mode device 110 may receive the signal from second dual-mode device 120 and may determine an optimal high frequency communications mode to use in communication with second dual-mode device 120 through high frequency communications channel 150 (e.g., forward link). In particular, first dual-mode device 110 may infer the optimal high frequency communications mode based on signals first dual-mode device 110 receives through a reverse link.

For example, reverse link circuitry 114 may receive a signal (e.g., a data or training signal) from reverse link circuitry 124 (FIG. 1). The signal transmitted by reverse link circuitry 124 may be a probing signal that is used for channel estimation. The signal may be transmitted by reverse link circuitry 124 using any combination of the available high frequency communications modes (e.g., OFDM and/or SC modulation) in second dual-mode device 120 with any range of frequency carriers not limited to 57 GHz, 58 GHz, 60 GHz, 61 GHz, 62 GHz, 63 GHz, 64 GHz, 65 GHz, 66 GHz, 67 GHz or any range of frequencies between 57-67 GHz.

Reverse link circuitry 114 may provide data associated with the received signal to channel characteristic computation circuitry 310. Channel characteristic computation circuitry 310 may compute the channel estimate, channel length, delay spread or any other suitable channel characteristic of the reverse link based on the received signal. Channel characteristic computation circuitry 310 may determine a channel characteristic of high frequency communications channel 150 (e.g., forward link) based on the channel characteristic of the reverse link. For example, channel characteristic computation circuitry 310 may compute the channel length associated with the reverse link (e.g., low band communications channel 160) and may determine the channel length of the forward link (e.g., high frequency communications channel 150) by computing the reciprocal of the reverse link channel length.

Channel characteristic computation circuitry 310 may provide the computed channel characteristic associated with high frequency communications channel 150 to high frequency communications mode selection circuitry 320. High frequency communications mode selection circuitry 320 may determine an optimal high frequency communications mode to use in communicating with second dual-mode device 120 based on the channel characteristic associated with high frequency communications channel 150. As discussed above, high frequency communications mode selection circuitry 320 may enable/disable the appropriate high frequency communications mode circuitry 130a or 140a and may provide information indicative of the selection to transmission circuitry 330. Transmission circuitry 330 may operate using the selected high frequency communications mode.

In some implementations, high frequency communications mode selection circuitries 230 and 320 (FIGS. 2 and 3) may include other channel dependent functions in selecting an optimal communications mode. For example, high frequency communications mode selection circuitries 230 and 320 may include computation circuitry that determine coefficients or values used in shaping or steering a beam (using multiple antennas 116) towards a particular device (e.g., performing beamforming). In particular, beamforming may be used to steer a signal in the strongest direction from first dual-mode device 110 to second dual-mode device 120. High frequency communications mode selection circuitries 230 and 320 may include computation circuitry for selecting an optimal transmission rate (e.g., 2 Gbit/s, 2.5 Gbit/s, 100 Mbit/s, or any other suitable transmission rate) to use with the selected high frequency commutations mode. High frequency communications mode selection circuitries 230 and 320 may include computation circuitry to select an optimal antenna to transmit/receive signals to/from another dual-mode device.

Figure 4:
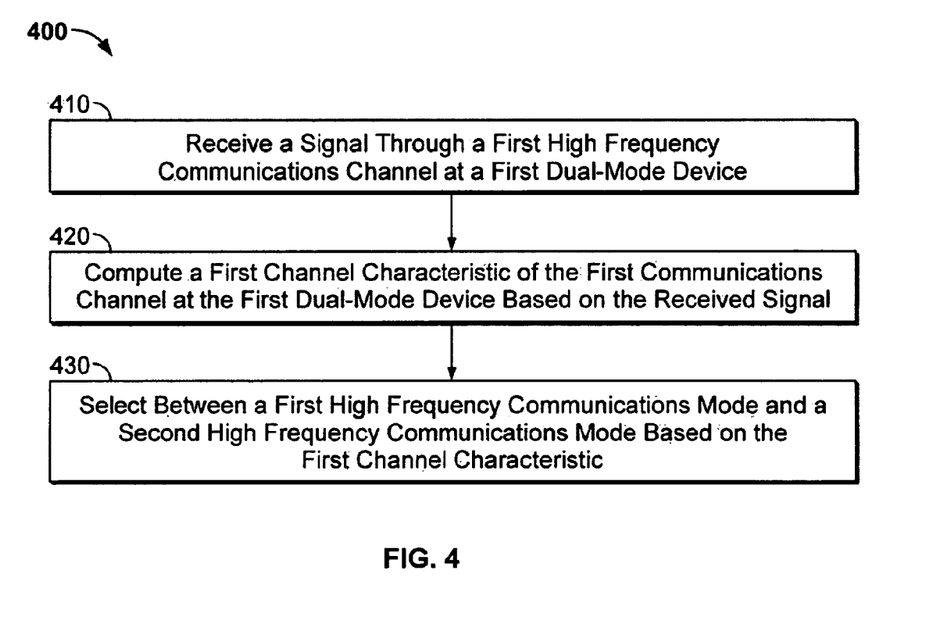
FIGS. 4-6 illustrate processes for adaptively selecting a high frequency communications mode in accordance with an embodiment of the present invention.

FIG. 4 illustrates a process 400 for adaptively selecting a high frequency communications mode in accordance with an embodiment of the present invention. At step 410, a signal is received through a first high frequency communications channel at a first dual-mode device. For example, first dual-mode device 110 may receive a signal from second dual-mode device 120 over high frequency communications channel 150 (FIG. 1). The signal may be a data or training signal or some other signal that may be used to estimate or compute a characteristic of high frequency communications channel 150.

At step 420, a first channel characteristic of the first communications channel is computed at the first dual-mode device based on the received signal. For example, channel characteristic computation circuitry 220 or 310 may compute a channel length, a channel estimate, a delay spread or some other suitable characteristic associated with the high frequency communications channel 150 (FIGS. 2 and 3).

At step 430, a selection is made between a first high frequency communications mode and a second high frequency communications mode based on the first channel characteristic. For example, high frequency communications mode selection circuitry 230 or 320 may determine an optimal high frequency communications mode based on the channel characteristic computed by channel characteristic computation circuitry 220 or 310 (FIGS. 2 and 3). In particular, when the delay spread associated with high frequency communications channel 150 is high, high frequency communications mode selection circuitry 230 or 320 may determine that the optimal high frequency communications mode is OFDM (e.g., first high frequency communications mode circuitry 130). When the delay spread associated with high frequency communications channel 150 is low, high frequency communications mode selection circuitry 230 or 320 may determine that the optimal high frequency communications mode is SC modulation (e.g., second high frequency communications mode 140). High frequency communications mode selection circuitry 230 or 320 may select the optimal high frequency communications mode by enabling/disabling the appropriate high frequency communications mode circuitry 130 and 140 using respective control signals 132 and 142 (FIG. 1).

Figure 5:
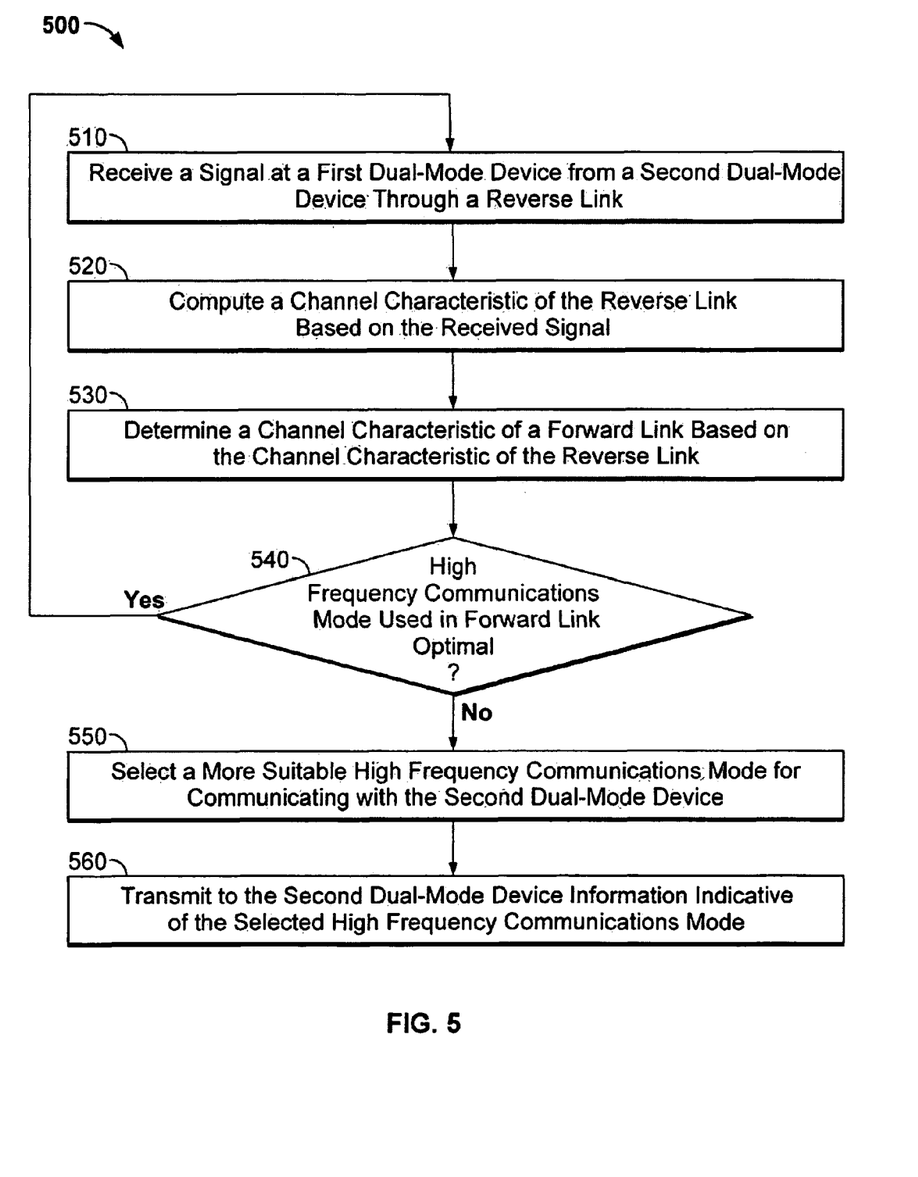

FIG. 5 illustrates a process 500 for adaptively selecting a high frequency communications mode in accordance with an embodiment of the present invention. At step 510, a signal is received at a first dual-mode device through a reverse link from a second dual-mode device. For example, first dual-mode device 110 may receive a signal from second dual-mode device 120 over low band communications channel 160 (e.g., reverse link) (FIG. 1). The signal may be a data or training signal or some other signal that may be used to estimate or compute a characteristic of high frequency communications channel 150.

At step 520, a channel characteristic of the reverse link is computed based on the received signal at the first dual-mode device. For example, channel characteristic computation circuitry 220 or 310 may compute a channel length, a channel estimate, a delay spread or some other suitable characteristic associated with the low band communications channel 160 based on the signal received through the reverse link (FIGS. 2 and 3).

At step 530, a channel characteristic of the forward link is determined based on the channel characteristic of the reverse link at the first dual-mode device. For example, channel characteristic computation circuitry 220 or 310 in the first dual-mode device may compute a reciprocal of the channel length associated with the reverse link to determine the channel length or a channel characteristic associated with high frequency communications channel 150 (e.g., forward link).

At step 540, a determination is made as to whether the high frequency communications mode used in the forward link is optimal. For example, high frequency communications mode selection circuitry 230 or 320 in the first dual-mode device may determine an optimal high frequency communications mode based on the channel characteristic computed by channel characteristic computation circuitry 220 or 310 (FIGS. 2 and 3). In particular, when the delay spread associated with high frequency communications channel 150 is high, high frequency communications mode selection circuitry 230 or 320 may determine that the optimal high frequency communications mode is OFDM (e.g., first high frequency communications mode circuitry 130*a*). When the delay spread associated with high frequency communications channel 150 is low, high frequency communications mode selection circuitry 230 or 320 may determine that the optimal high frequency communications mode is SC modulation (e.g., second high frequency communications mode 140*a*). If the high frequency communications mode being used is optimal, the first dual-mode device returns to step 510 to receive another signal (e.g., a synchronization signal, data signal or some other training signal) to evaluate or compute the channel characteristic. If the high frequency communications mode being used is not optimal, at step 550, a more suitable high frequency communications mode is selected by first dual-mode device 110 for communicating with second dual-mode device 120.

At step 560, information indicative of the selected high frequency communications mode is transmitted to second dual-mode device 120 from first dual-mode device 110. For example, high frequency communications mode selection circuitry 230 or 320 may select the optimal high frequency communications mode and provide information indicative of the selected mode to transmission circuitry 240 or 330 for transmission to second dual-mode device 120 (FIGS. 2 and 3). First and second dual-mode devices 110 and 120 may then proceed to communicate using the selected high frequency communications mode.

Figure 6:
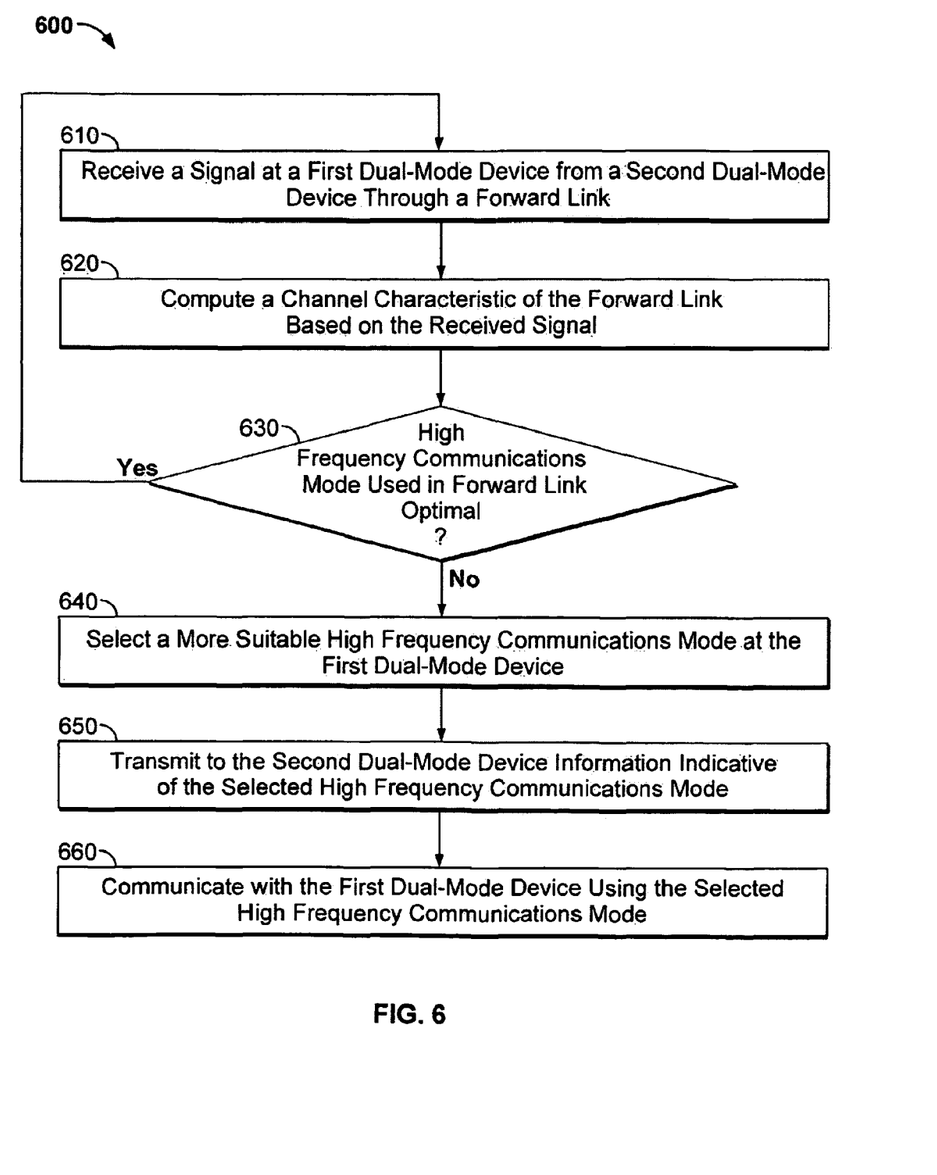

FIG. 6 illustrates a process 600 for adaptively selecting a high frequency communications mode in accordance with an embodiment of the present invention. At step 610, a signal is received at a first dual-mode device through a forward link from a second dual-mode device. For example, first dual-mode device 110 may receive a signal from second dual-mode device 120 over the forward link (e.g., high frequency communications channel 150). The signal may be a data or training signal or some other signal that may be used to estimate or compute a characteristic of the forward link.

At step 620, a channel characteristic of the forward link is computed based on the received signal at the first dual-mode device. For example, channel characteristic computation circuitry 220 or 310 may compute a channel length, a channel estimate, a delay spread or some other suitable characteristic associated with the forward link (e.g., high frequency communications channel 150) (FIGS. 2 and 3).

At step 630, a determination is made as to whether the high frequency communications mode used in the forward link is optimal at the first dual-mode device. For example, high frequency communications mode selection circuitry 230 or 320 may determine an optimal high frequency communications mode based on the channel characteristic computed by channel characteristic computation circuitry 220 or 310 (FIGS. 2 and 3). In particular, when the delay spread associated with high frequency communications channel 150 is high, high frequency communications mode selection circuitry 230 or 320 may determine that the optimal high frequency communications mode is OFDM (e.g., first high frequency communications mode circuitry 130*a*). When the delay spread associated with high frequency communications channel 150 is low, high frequency communications mode selection circuitry 230 or 320 may determine that the optimal high frequency communications mode is SC modulation (e.g., second high frequency communications mode 140*a*). If the high frequency communications mode being used is optimal, the first dual-mode device returns to step 610 to receive another signal (e.g., a synchronization signal) or a data signal to evaluate the channel characteristic. If the high frequency communications mode being used is not optimal, at step 640, a more suitable high frequency communications mode is selected by the first dual-mode device.

At step 650, information indicative of the selected high frequency communications mode is transmitted to the second dual-mode device from the first dual-mode device. For example, high frequency communications mode selection circuitry 230 or 320 may select the optimal high frequency communications mode and provide information indicative of the selected mode to transmission circuitry 240 or 330 for transmission to second dual-mode device 120 (FIGS. 2 and 3). First and second dual-mode devices 110 and 120 may the proceed to communicate using the selected high frequency communications mode.

At step 660, the second dual-mode device communicates with the first dual-mode device using the selected high frequency communications mode. For example, second dual-mode device 120 may transmit and receive data to/from first dual-mode device 110 through high frequency communications channel 150 using first high frequency communications mode circuitry 130 or second high frequency communications mode circuitry 140 (FIG. 1).

The foregoing describes methods and apparatus for adaptively selecting a high frequency communications mode in high frequency systems. The above described embodiments of the present invention are presented for the purposes of illustration and not of limitation. It should be understood that any of the described embodiments or parts of the embodiments or implementations may be combined or modified. Furthermore, the present invention is not limited to a particular implementation. The invention may be implemented in hardware, such as on an application specific integrated circuit (ASIC) or on a field-programmable gate array (FPGA). The invention may also be implemented in software.

What is claimed is:

1. A method comprising:
   receiving, using control circuitry and at a first wireless device, a signal through a high-frequency communications channel in the range of 57-67 GHz;
   determining a length of the high-frequency communications channel based on the received signal;
   transmitting a data signal that comprises an indication of the determined length of the high-frequency communications channel from the first wireless device to a second wireless device, wherein the data signal is transmitted using a low band communications channel in the range of 2-5 GHz;
   comparing the length of the high-frequency communications channel to a threshold; and
   selecting between a first modulation scheme and a second modulation scheme, wherein the first modulation scheme is selected when the length of the high-frequency communications channel exceeds the threshold, and the second modulation scheme is selected when the length of the high-frequency communications channel is below the threshold.

2. The method of claim 1, wherein the first modulation scheme is an orthogonal frequency division multiplexing (OFDM) scheme, and the second modulation scheme is a single-carrier (SC) modulation scheme.

3. The method of claim 1, wherein the length of the high-frequency communications channel corresponds to a delay spread of the high-frequency communications channel.

4. The method of claim 1, the method further comprising:
   transmitting to the second wireless device, information that indicates whether the first modulation scheme or the second modulation scheme has been selected.

5. The method of claim 1, the method further comprising:
   performing the comparing and the selecting at the second wireless device based on the transmitted indication.

6. The method of claim 1, wherein the high-frequency communications channel is a first high-frequency communications channel, the method further comprising:
   applying the selected modulation scheme to a second high-frequency communications channel in the range of 57-67 GHz.

7. The method of claim 6, wherein the first high-frequency communications channel corresponds to a forward link and the second high-frequency communications channel corresponds to a reverse link.

8. The method of claim 1, wherein determining the length of the high-frequency communications channel based on the received signal comprises:
   identifying pilot signals included in the received signal;
   computing a channel estimate based on the identified pilot signals; and
   determining the length of the high-frequency communications channel based on the computed channel estimate.

9. The method of claim 1, wherein selecting between the first modulation scheme and the second modulation scheme comprises:
   selecting a transmission rate for communicating across the high-frequency communications channel.

10. The method of claim 1, wherein selecting between the first modulation scheme and the second modulation scheme comprises:
    selecting one of a plurality of receive antennas for communicating across the high-frequency communications channel.

11. A first wireless device comprising:
    receiver circuitry configured to receive a signal through a high-frequency communications channel in the range of 57-67 GHz; and
    control circuitry configured to:
      determine a length of the high-frequency communications channel based on the received signal;
      transmit a data signal comprising an indication of the determined length of the high-frequency communications channel from the first wireless device to a second wireless device, wherein the data signal is transmitted using a low band communications channel in the range of 2-5 GHz;
      cause the length of the high-frequency communications channel to be compared to a threshold; and
      cause a selection between a first modulation scheme and a second modulation scheme, wherein the first modulation scheme is selected when the length of the high-frequency communications channel exceeds the threshold, and the second modulation scheme is selected when the length of the high-frequency communications channel is below the threshold.

12. The first wireless device of claim 11, wherein the first modulation scheme is an orthogonal frequency division multiplexing (OFDM) scheme, and the second modulation scheme is a single-carrier (SC) modulation scheme.

13. The first wireless device of claim 11, wherein the length of the high-frequency communications channel corresponds to a delay spread of the high-frequency communications channel.

14. The first wireless device of claim 11, wherein the control circuitry is further configured to:
    transmit to the second wireless device, information that indicates whether the first modulation scheme or the second modulation scheme has been selected.

15. The first wireless device of claim 11, wherein the control circuitry is further configured to:
  cause the second wireless device to:
    compare the length of the high-frequency communications channel to a threshold; and
    select between the first modulation scheme and the second modulation scheme based on the transmitted indication of the determined length of the high-frequency communications channel.

16. The first wireless device of claim 11, wherein the high-frequency communications channel is a first high-frequency communications channel, and the control circuitry is further configured to:
  apply the selected modulation scheme to a second high-frequency communications channel in the range of 57-67 GHz.

17. The first wireless device of claim 16, wherein the first high-frequency communications channel corresponds to a forward link and the second high-frequency communications channel corresponds to a reverse link.

18. The first wireless device of claim 11, wherein the control circuitry determines the length of the high-frequency communications channel by being further configured to:
  identify pilot signals included in the received signal;
  compute a channel estimate based on the identified pilot signals; and
  determine the length of the high-frequency communications channel based on the computed channel estimate.

19. The first wireless device of claim 11, wherein the control circuitry is further configured to:
  select a transmission rate for communicating across the high-frequency communications channel.

20. The first wireless device of claim 11, wherein the control circuitry is further configured to:
  select one of a plurality of receive antennas for communicating across the high-frequency communications channel.

* * * * *